(12) United States Patent
McKinlay

(10) Patent No.: US 6,554,552 B2
(45) Date of Patent: Apr. 29, 2003

(54) WEDGE-LOCKING FASTENER ASSEMBLY WITH RING RETAINER FOR WASHER

(75) Inventor: Alistair N. McKinlay, LaQuinta, CA (US)

(73) Assignee: Hong-Kong Disc Lock Company Ltd., Wancha (HK)

( * ) Notice: Subject to any disclaimer, the term of this patent is extended or adjusted under 35 U.S.C. 154(b) by 0 days.

(21) Appl. No.: 09/843,585

(22) Filed: Apr. 26, 2001

(65) Prior Publication Data

US 2002/0159857 A1 Oct. 31, 2002

(51) Int. Cl.[7] .......................... F16B 37/08; F16B 39/24; F16B 43/00
(52) U.S. Cl. ..................... 411/149; 411/134; 411/432; 411/512; 411/533
(58) Field of Search ................................. 411/134, 432, 411/149, 150, 512, 517, 533

(56) References Cited

U.S. PATENT DOCUMENTS

| 1,418,379 | A | * | 6/1922 | Karle ..................... 411/517 X |
| 2,679,880 | A | | 6/1954 | Poupitch ...................... 151/37 |
| 3,238,581 | A | | 3/1966 | Sawyer ......................... 24/71 |
| 3,680,619 | A | | 8/1972 | Sparks ......................... 151/36 |
| 4,140,870 | A | | 2/1979 | Volkers et al. ................ 174/78 |
| 4,362,449 | A | | 12/1982 | Hlinsky ..................... 411/156 |
| 5,190,423 | A | | 3/1993 | Ewing ........................ 411/134 |
| 5,203,656 | A | | 4/1993 | McKinlay ................... 411/149 |
| 5,314,279 | A | | 5/1994 | Ewing ........................ 411/134 |
| 5,920,959 | A | * | 7/1999 | DeMarco ................. 411/512 X |

\* cited by examiner

*Primary Examiner*—Neill Wilson
(74) *Attorney, Agent, or Firm*—Charles W. Chandler

(57) ABSTRACT

A combination nut and washer is retained in a preassembled position by an annular pilot that extends toward the central hole in the washer to permit the washer to be rotated 360° with respect to the nut. The lower end of the pilot has a groove. A split ring is mounted in the groove to retain the washer in its preassembled position with respect to the nut.

8 Claims, 4 Drawing Sheets

WEDGE-LOCKING FASTENER ASSEMBLY WITH RING RETAINER FOR WASHER

BACKGROUND AND SUMMARY OF THE INVENTION

It is desirable to have threaded locking fasteners such as a nut and one or two lock washers retained in a preassembled condition to prevent the washers from being mounted in a reverse position when the nut is used as a fastener. The prior art discloses the use of a cylindrical pilot or sleeve carried on the nut. The washer is mounted on the sleeve. The lower end of the sleeve is flared outwardly to a diameter greater than the central hole in the washer to retain the washer on the nut.

Examples of such prior art may be found in U.S. Pat. Nos. 3,238,581 issued Mar. 8, 1966 to Frank L. Sawyer for "Toggle Latch Construction", see FIG. 4; 3,680,619 issued Aug. 1, 1972 to Harold R. Sparks for "Lock Washer", see FIG. 8; 4,140,870 issued Feb. 20, 1979 to Jack C. Volkers et al. for "Cable Ground System", see FIG. 5; 4,362,449 issued Dec. 7, 1982 to Emil J. Hlinsky for "Fastener Assemblies", see FIG. 4; 5,190,423 issued Mar. 2, 1993 to Paul E. Ewing for "Locking Fastener", see FIG. 5; 5,203,656 issued Apr. 20, 1993 to Alistair N. McKinlay for "Self-Centering, Self-Tightening Fastener", see FIG. 5; 5,314,279 issued May 24, 1994 to Paul E. Ewing for "Locking Fastener", see FIG. 5.

U.S. Pat. No. 2,679,850 issued Jun. 1, 1954 to O. J. Poupitch for "Coupled Nut and Lock Washer" shows a similar instruction but in which the lower end of the cylindrical pilot has an annular flange for retaining the washer.

The preferred embodiment of the invention comprises a wedge type locking nut and washer assembly comprising a nut and two washers connected together by a split ring retainer. The nut has a cylindrical pilot that extends along the turning axis of the nut beneath the camming face of the nut head. The length of the pilot is sufficient to mount a hex flanged nut and an inverted cup-type washer. The split ring retains the two washers on the pilot in a preassembled position with respect to the nut. For illustrative purposes, the hex flange nut has a cammed surface that faces and engages the cammed surface on the nut. The bottom surface of the hex flanged nut has an annular array of mini cams that is engageable with an annular array of similarly-shaped mini cams on the cup-shaped washer. The center portion of the cup-shaped washer has a concave configuration enclosing the retainer to permit the lower side of the cup-washer to engage the workpiece without interference with the pilot.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
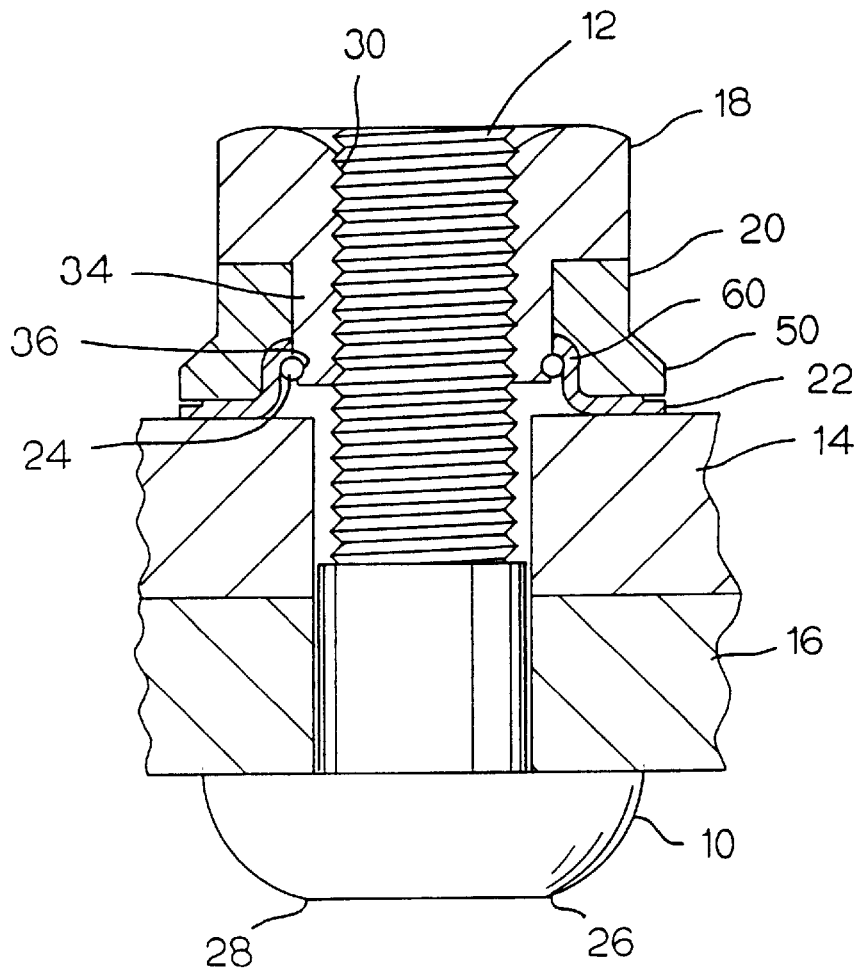
FIG. 1 is a sectional view taken through a fastener assembly illustrating the invention. The fastener assembly is shown securing two workpieces together.

Referring to the drawings, FIG. 1 shows a nut assembly constructed in accordance with the invention. The nut assembly is mounted on a steel button headed bolt 10 having a threaded shank 12 extending through two workpieces 14 and 16. The nut assembly could be used as a wheel nut such as illustrated in my U.S. Pat. No. 6,039,524, issued Mar. 21, 2000 for "Self-Locking Safety Wheel Nut with Locking Wrench".

A steel nut 18 is mounted on the threaded shank. A flanged washer 20 and a cup-shaped washer 22 are mounted between the head of the nut and workpiece 14. Washers 20 and 22 are held on the nut by a split retaining ring 24. Retaining ring 24 prevents the washers from being mounted in a reverse direction on the nut.

Bolt 10 has a button-shaped head 26 with a rounded exposed surface 28. Shank 12 extends axially from head 26. The rounded surface contour on the head resists being gripped by a wrench or pliers.

The preferred nut assembly may be mounted on other threaded shanks, not having a button-head, which extend through an opening in a workpiece on which the nut is to be mounted.

Referring to FIGS. 1 and 4–6, nut 18 has an internal threaded surface 30 meshed with a continuous thread surface on shank 12 by applying a wrench to flat multi-sided external surfaces 32 on the head of nut 18. Preferably, the nut has a hexagonally-shaped head.

The nut has a generally cylindrical sleeve or pilot 34, which extends down from the bottom face of the nut. The pilot has a sufficient length to mount washers 20 and 22 while permitting each of the washers to be rotated in a 360° direction with respect to the head as well as providing some axial movement.

The central opening of the pilot is also internally threaded to form a continuous thread with that of the nut head. The lower end of the pilot has an annular retainer groove 36 for receiving split ring 24 when the two washers have been assembled with the nut.

The lower face 38 of the nut has a camming surface comprising a plurality of circumferentially spaced ramps 40 and a corresponding number of connecting shoulders 42, for form an undulating cam surface.

Nut 18 is hot formed from 1045 steel. Prior to heat treating, retainer groove 36 is formed on the lower outside of the pilot, and then heat-treated to HRC 38–40.

Flange washer 20 has a hexagonal head 44 with a configuration identical to the hexagonal head of the nut so the nut and washer 20 can be turned as a unit by the same wrench, not shown. Washer 20 has a top camming surface 35 comprising six ramps 46 connected by short shoulders 48. The ramps and shoulders on camming surface 35 interlock with cams 40 and 42 on the bottom side of the nut. Each camming surface has a continuous uninterrupted undulating contour. There are no obstructions or ledges preventing relative rotation between the nut and the camming surface of the flange washer while the camming surfaces are engaged.

The flanged washer has an annular flange 50, which is larger in diameter than the hexagonal head 44. The lower surface of the flange has a camming surface 52 which comprises 18 equally spaced mini-cams each comprising a ramp 54 and a shoulder 56.

The flange washer is also made 4140 steel material, hot formed and heat-treated to HRC-37–39.

The flanged washer has a central opening 58 with a diameter slightly larger than the outside diameter of the pilot. Washer 20 is formed with an internal annular concave groove 60. As best shown in FIG. 1, retaining ring 24 is mounted in retainer groove 36 closely adjacent and within groove 60.

The cup type washer 20 is formed from a 10—10 steel material, case hardened to HRC-45–60 to a depth of about 0.005 inches.

Figure 10:
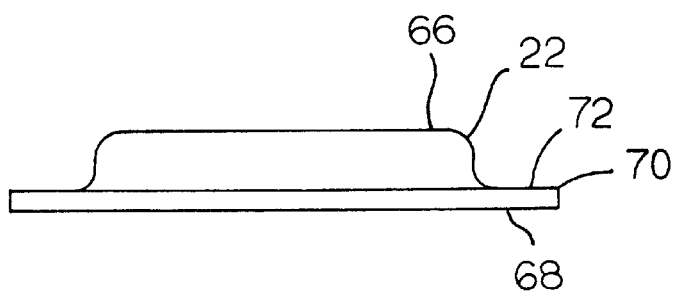
FIG. 10 is a side view of the cup washer.
Figure 11:
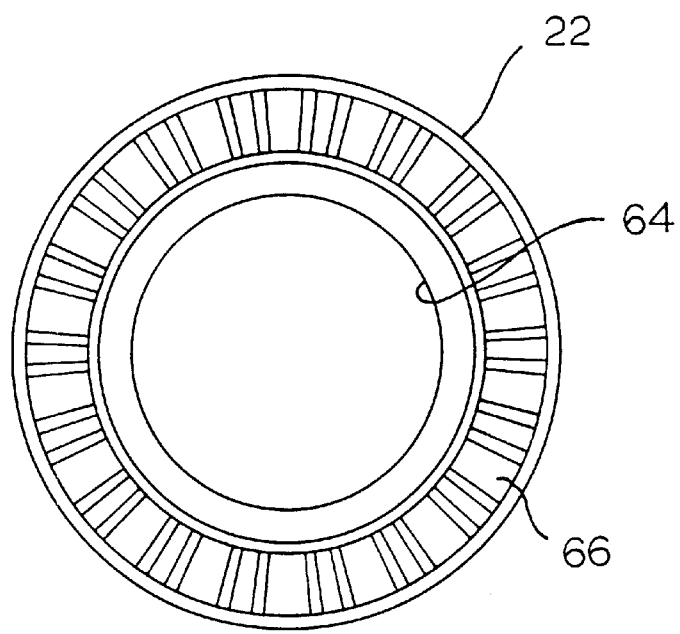
FIG. 11 is a top view of the cup washer showing the mini cams.

Referring to FIGS. 10 and 11, cup-shaped washer 22 has a dish-shaped configuration with a central hole 64 for loosely sliding on the pilot. The distance between the top surface 66 and the bottom flat surface 68 of washer 22 is sufficient to enclose the retaining ring. Washer 22 has a flange 70 with a diameter corresponding to the diameter of flange 50. The upper surface 72 of the flange has 18 mini-cams that are identical to the mini-cam profile on the bottom of the flanged washer and mate with camming surface 52 of the flanged washer.

The convex side of the dish-shaped area of the washer fits into the concave groove 60 on the underside of the flanged nut, and leaves sufficient room for the split ring to be inserted into pilot groove 30 during final assembly.

The two mating camming surfaces engage one another such that when the nut is rotated during the nut tightening operation, the bottom flat surface on the washer 68 becomes frictionally anchored to the top surface of workpiece 14. Further, rotation of the nut in the tightening direction causes the shoulders on the two mating pairs of the camming surfaces to push the shoulders on the mating camming surfaces until the nut is fully tightened.

Figure 4:
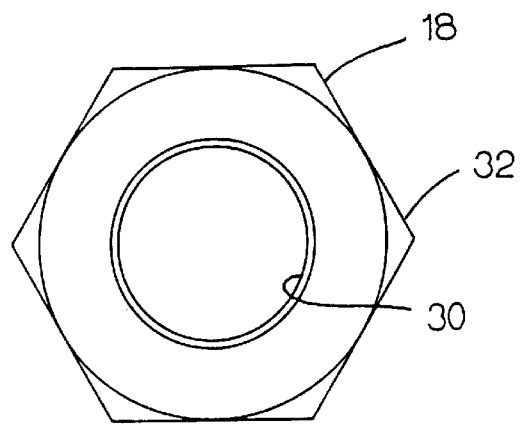
FIG. 4 is a plan view of the preferred nut.
Figure 5:
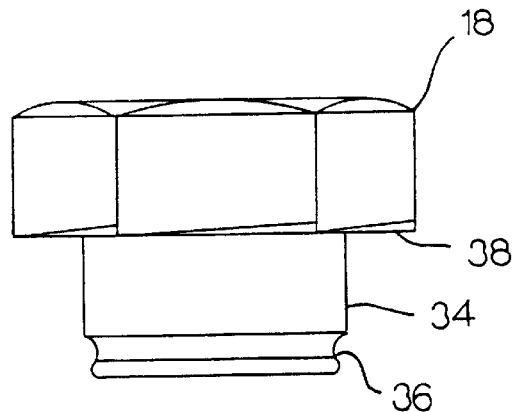
FIG. 5 is a side view of the preferred nut, showing the pilot.
Figure 6:
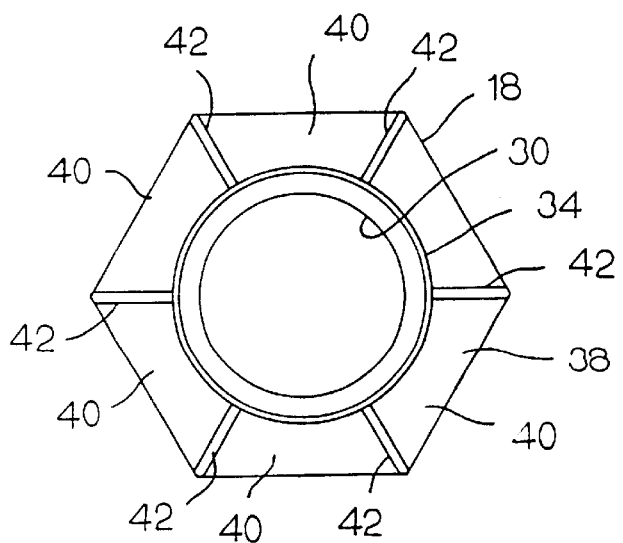
FIG. 6 is a view of the nut as seen from the bottom of FIG. 5.
Figure 7:
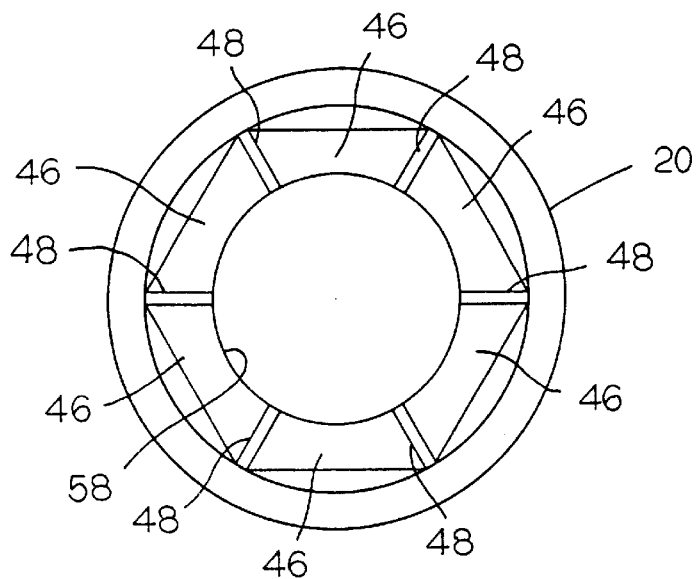
FIG. 7 is a plan view of the preferred hex flange washer.
Figure 8:
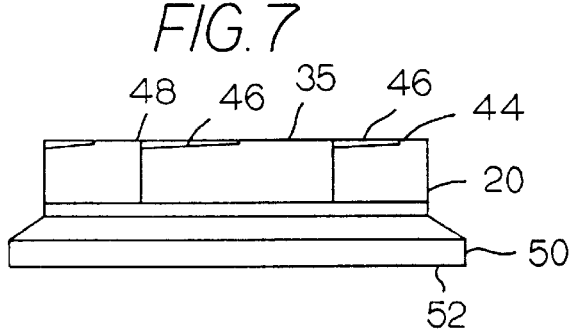
FIG. 8 is a side view of the preferred hex flange washer.
Figure 9:
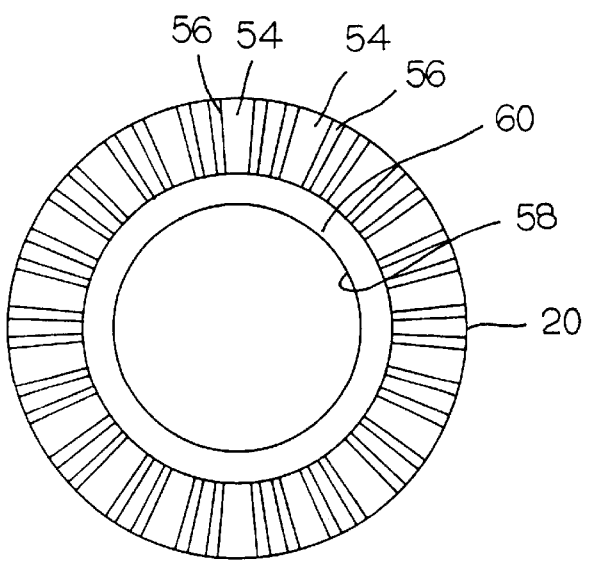
FIG. 9 is a bottom view of the hex flange washer.

When the nut is rotated in a loosening or a counter-clockwise direction as viewed in FIG. 4, either by vibration or deliberately, the ramps on the nut slide up the ramps on the flanged washer, while the ramps on the lower camming surface of the flanged washer slide up on the ramps surface on the camming surface 72 flange of the washer 22. This camming action is illustrated in this type of wedge-locking fastener assembly, for example in U.S. Pat. No. 5,626,449, issued May 6, 1997 for "Wedge-locking Fastener Assembly with a Cammed Surface" in columns 4 and 5, which are incorporated herein by reference, to describe the camming action of the two camming surfaces.

When the nut is being assembled, washers 20 and 22 are assembled on pilot 34 and retaining ring 24 is snapped into retaining groove 36 to retain the washers in their relative position on the pilot.

Figures 2, 3:
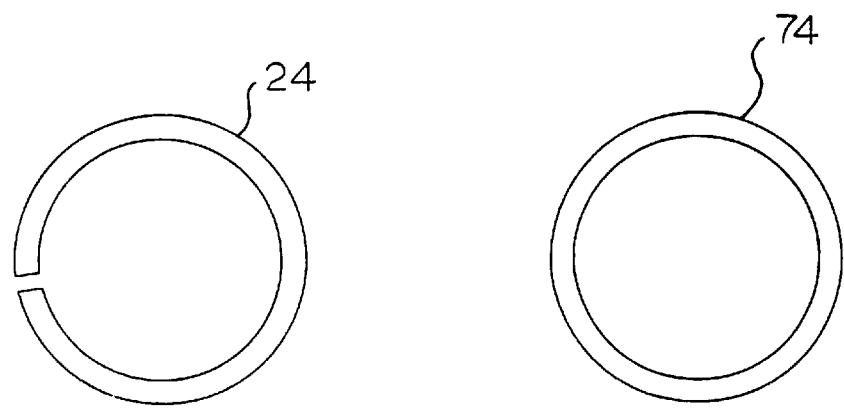
FIG. 2 is a view of a split ring used for holding the nut and washers together as a unit.
FIG. 3 is a view of a resilient ring that can be used as a substitute for the ring of FIG. 2.

Alternatively, a resilient o-ring 74, shown in FIG. 3, may be substituted for the split ring. The o-ring can be snapped into groove 36. Referring to FIG. 1, when using either retaining ring, the outer portion of the ring extends beyond groove 36 and overlaps the inner diameter of the opening of both washers to hold both washers on the pilot.

One advantage of this invention with respect to pilots that are flared outwardly is that the requirement for the flaring process limits the hardness heat treating level to a maximum of about HRC-28, thus sacrificing integrity and strength of the nut component.

This new nut design allows the nut component to be heat-treated to a high end of SAE Grade 8 (Class 10 Metric), that is, of up to as high as HRC 38–40. The result is a nut component with far greater hardness, strength and integrity, which will withstand the common abuses of installation, removal and severe in-service conditions. The superior hardness of this nut component also results in much stronger threads, useful for higher loads and tensile strengths.

Another important feature is that the higher hardness level permits a lower profile nut which will fit in applications that taller nut assemblies currently cannot fit, and still exceed current industry standards regarding proof loads and tensile strength.

This nut is useful not only when combined with a bolt, but also when used as a wheel nut. I believe that the double spring action feature due to the concave cavity of the hex flange washer and the geometrical shape of the inverted area of the cup-shaped washer causes a form of a rebound action resulting in the spring action of the two components working under load.

Unlike current designs using an externally attached bottom component, a cup-type washer internally mounted on the pilot of the nut eliminates the possibility of the bottom washer moving "out-of-line" or slipping in relation to the top workpiece.

Having described my invention, I claim:

1. A wedge action fastener assembly, comprising:

a nut having a multi-sided wrench-engaging head having a threaded internal surface rotatable about an axis, the threaded internal surface on the nut having a continuous thread, a camming end face on a first side of the nut, and an integral pilot extending axially from said first side of the nut, the pilot having a retainer ring recess formed about said axis and disposed a predetermined axial distance from said camming end face;

a flanged washer (20) having an inner bore rotatably mounted on the pilot and capable of axial slidable motion with respect to the nut, the flanged washer having a second camming end face interengageable with the camming end face of the nut;

the flanged washer having a head with a configuration corresponding to the multi-sided head of the nut whereby a wrench can be used to engage the heads of both the nut and the flanged washer to rotate them as a unit, the flanged washer having an annular flange and a third camming face formed on said annular flange;

the flanged washer having an internal annular groove;

a second washer (22) having a camming face slidably engageable with the third camming face of the flanged washer, and a workpiece engaging surface, the distance between the workpiece-engaging surface and the nut being greater than the length of the pilot;

the second washer having a central opening rotatably slidably mounted on the pilot between the flanged washer and the retainer ring recess;

the second washer having a central dish-shaped section having a convex surface received in the annular groove of the flanged washer, and an annular concave surface axially spaced from the workpiece engaging surface on the second washer; and a retainer disposed in the retainer ring recess and engageable with the annular concave surface of the second washer to retain both the flanged washer and the second washer on the pilot, and permitting axial motion of the flanged washer and the second washer on the pilot with respect to the nut.

2. A fastener assembly as defined in claim 1, in which the second washer has a dished area enclosing the retainer recess on the pilot.

3. A fastener assembly as defined in claim 1, in which the retainer is an expansible split ring mounted in the retainer recess.

4. A fastener assembly as defined in claim 1, in which the retainer is a resilient o-ring mounted in the retainer recess.

5. A fastener assembly as defined in claim 1, in which the retainer receiving structure comprises an annular groove, and the retainer comprises a ring mated in the annular groove.

6. A fastener assembly as defined in claim 1, in which the retainer is an expansible split ring mounted in the retainer ring recess.

7. A fastener assembly as defined in claim 1, in which the retainer is a resilient o-ring mounted in the retainer ring recess.

8. A wedge-lock fastener assembly, comprising:

a nut having a central openings a first wedge-lock camming surface, and a cylindrical pilot extending from the first wedge-lock camming surface, the pilot having a central opening aligned with the central opening in the nut, the nut and the pilot having a continuous internal fastening thread, the pilot having a retainer-receiving structure thereon;

a first washer (20) having a second wedge-lock camming surface engageable with the first wedge-lock camming surface of the nut, the first washer having a central opening mounted on the pilot so as to be rotatable thereon about the axis of the central opening of the nut, and axially movable thereon, the first washer having an internal annular concave groove;

a second washer (22) having an inner bore rotatably mounted on the pilot and capable of axial slidable motion with respect to the nut, the second washer having a third wedge-lock camming surface interengageable with the second wedge-lock surface camming surface of the first washer and a workpiece-engaging surface;

the first washer being disposed on the pilot between the first wedge-lock camming surface of the nut, and the retainer-receiving structure on the pilot;

the second washer having a central dish-shaped section having an annular convex surface slidably received in internal annular groove of the first washer, and an annular concave surface axially spaced from the workpiece-engaging surface on the second washer; and a retainer mounted in the retainer-receiving structure of the pilot and the annular convex surface of the second washer to prevent removal of the second washer from the pilot.

* * * * *